(12) United States Patent
Metcalfe et al.

(10) Patent No.: US 7,490,576 B2
(45) Date of Patent: Feb. 17, 2009

(54) TIME OF FLIGHT TEAT LOCATION SYSTEM

(75) Inventors: Leonard Metcalfe, Surrey (CA); Cor Maas, Heerlen (NL)

(73) Assignee: LMI Technologies Ltd, Dublin (IE)

( * ) Notice: Subject to any disclaimer, the term of this patent is extended or adjusted under 35 U.S.C. 154(b) by 331 days.

(21) Appl. No.: 11/531,672

(22) Filed: Sep. 13, 2006

(65) Prior Publication Data

US 2007/0215052 A1     Sep. 20, 2007

(30) Foreign Application Priority Data

Mar. 15, 2006    (CA) .................................. 2539645

(51) Int. Cl.
*A01J 5/00*      (2006.01)
*A01J 5/017*     (2006.01)
(52) U.S. Cl. .................. 119/14.08; 119/14.14
(58) Field of Classification Search .......... 119/14.08, 119/14.03, 14.01, 14.02, 14.14
See application file for complete search history.

(56) References Cited

U.S. PATENT DOCUMENTS

| | | | | |
|---|---|---|---|---|
| 4,726,322 | A * | 2/1988 | Torsius ..................... | 119/14.14 |
| 5,412,420 | A | 5/1995 | Ellis | |
| 5,979,359 | A * | 11/1999 | Hansson .................. | 119/14.08 |
| 6,118,118 | A * | 9/2000 | van der Lely et al. ....... | 250/221 |
| 6,167,839 | B1 * | 1/2001 | Isaksson et al. .......... | 119/14.08 |
| 6,323,942 | B1 | 11/2001 | Bamji | |
| 6,363,883 | B1 * | 4/2002 | Birk ........................ | 119/14.08 |
| 6,532,892 | B1 * | 3/2003 | Nilsson .................... | 119/14.03 |
| 6,974,373 | B2 * | 12/2005 | Kriesel ..................... | 452/157 |
| 7,299,766 | B2 * | 11/2007 | Van Den Berg et al. .. | 119/14.02 |
| 2005/0136819 | A1 | 6/2005 | Kriesel | |
| 2006/0249082 | A1 * | 11/2006 | Holmertz et al. ......... | 119/14.02 |

FOREIGN PATENT DOCUMENTS

| | | |
|---|---|---|
| WO | WO 97/15900 A1 | 5/1997 |
| WO | WO 97/15901 A1 | 5/1997 |
| WO | WO 98/44782 A1 | 10/1998 |
| WO | WO 98/45808 A1 | 10/1998 |
| WO | WO 98/47348 A1 | 10/1998 |
| WO | WO 99/03064 A1 | 1/1999 |
| WO | WO 00/04765 A1 | 2/2000 |
| WO | WO 00/11935 A1 | 3/2000 |
| WO | WO 00/62602 A1 | 10/2000 |
| WO | WO 01/19172 A1 | 3/2001 |
| WO | WO 01/52633 A1 | 7/2001 |

OTHER PUBLICATIONS

Tillet, R.D., et al., "Extracting Morphological Data From 3D Images of Pigs," (AgEng2004) Conference, Leuven, pp. 203-222, Belgium, Sep. 12-16, 2004.

(Continued)

*Primary Examiner*—Yvonne R. Abbott
(74) *Attorney, Agent, or Firm*—Michael A. Glenn; Glenn Patent Group

(57) ABSTRACT

A teat location system for automated milking systems comprises a light projection source and a camera having a two dimensional array of pixels, each of which is capable of returning time of flight information as well as intensity. Depth of field limitations and the problem of overlapping teat images are thereby overcome or minimized.

3 Claims, 2 Drawing Sheets

OTHER PUBLICATIONS

Information from Jerry's Taurus Studio, 3D Stereo Vision, located at www.taurusstudio.net/research/stereo/background.htm, date unknown, printed on Feb. 2, 2007.

Information from CSEM website, FAQ 3D-TOF and SR-3000, located at www.swissranger.ch/srfaq.php, date unknown, printed on Feb. 21, 2007.

Information from CSEM website, SR-3000 features, located at www.swissranger.ch/specifications.php, date unknown, printed on Feb. 21, 2007.

Information from CSEM website, SwissRanger SR-3000, located at www.swissranger.ch/main.php, date unknown, printed on Feb. 21, 2007.

Information from CSEM website, Swiss Ranger SR-2 Datasheet, located at http://www.csem.ch/detailed/pdf/p_531_SR-2_Preliminary-0355.pdf, 2005.

* cited by examiner

TIME OF FLIGHT TEAT LOCATION SYSTEM

CROSS REFERENCES TO RELATED APPLICATIONS

This Application claims priority to Canadian patent application serial no.: 2,539,645, filed Mar. 15, 2006, all of which is herein incorporated in its entirety by this reference thereto.

FIELD OF THE INVENTION

This invention relates to the automated detection of the location of animal teats for the purpose of controlling automated milking apparatus.

BACKGROUND OF THE INVENTION

It is known in the field of automated milking to use optical sensors to determine the attitude and location in three dimensions of the teats in order to guide the milking apparatus. Laser-based optical triangulation sensors are used to image the teats and to derive their position in three dimensions. Light is projected into the field of view and the reflected light is imaged on a camera that lies in the projection plane. The optics as well as the light source are housed in a sensor enclosure, the size of which must accommodate the optics involved.

The enclosure is typically mounted on a robot arm that is manipulated to obtain an unobstructed field of view of the various teats involved. The robot arm must be engineered to accommodate the weight and size of the sensor. The sensor seeks to image a relatively small area between the belly of the animal and the top of the milking cups. Given the size of the sensor housing, this provides a limited range of movement, which imposes a constraint on the quality of the images that can be obtained, particularly when one teat obstructs another.

Two teats at different distances but whose images overlap may, depending on the angle of the camera, appear to be at the same distance. Manipulation of the camera to acquire images from several angles may be necessary to discriminate between teats in such cases. This is a significant problem. Moreover, either of the field of view or the projected light might be obstructed.

In addition to needing to obtain an unobstructed view of the various teats, when several teats are at both different distances and different angles from the sensor, inaccuracies may also arise in assessing the location of the teats by triangulation. Manipulation of the robot arm can partially compensate for this, but additional computation is required to accurately assess distance.

In order to attach the milking cups to the teats, it is critical to obtain the orientation and location of the tips of the teats in 3D space. Triangulation devices achieve this by using the robot arm to move them around and analyze the results from successive scans. But the animal and its teats are not stationary but rather are in motion during the scanning. This results in unreliable determination of the absolute location and orientation of the teats.

One means of accommodating the movement of the animal is to image the hind legs and to assume that the movement of the hind legs approximates the movement of the teats. However that approach is of limited usefulness due to the limited depth of field of current optical triangulation systems.

Stereo imaging systems also face similar problems. Both cameras must image the same teat at the same time but the use of two cameras increases the risk of a teat being obscured by another at one of the cameras.

Ultrasonics-based sensing systems that are sometimes used in milking applications measure the time of flight of sound waves. The footprint of the sound waves drastically limits spatial resolution. In addition, the speed of sound is influenced by air temperature and humidity and airflow speeds, and echoing adds noise which must be accommodated in the processing of the image.

It is an object of the present invention to provide a teat sensing system in an automated milking system that overcomes the aforementioned disadvantages and that is compact, easy to manipulate and effective.

The objects of the invention will be better understood by reference to the detailed description of the preferred embodiment which follows.

SUMMARY OF THE INVENTION

According to one aspect, the invention comprises the use of a light source and a two-dimensional array camera having a plurality of pixels that are capable of individually providing time of flight data in an automated milking system. As a result, three dimensional data can be acquired from the imaged teats.

Such a system has the advantages of being very compact, very light and of not being subject to the same depth of field and obstruction limitation of other technologies used in milking applications.

In one of its aspects, the invention comprises the use, in an automated milking system having milking apparatus for extracting milk from a plurality of teats on a live animal, of a light source for illuminating the teats and a two-dimensional array camera having a plurality of pixels that are capable of individually providing time of flight data for capturing and delivering data for determining the location of the teats in three dimensions.

In another aspect the invention comprises an automated milking system for extracting milk from a plurality of teats on a live animal, comprising movable apparatus adapted to receive instructions characterizing the location of at least one of the teats, to move to that location, to engage at least one of the teats for extracting milk therefrom, a light source for illuminating an area encompassing the several teats, a two-dimensional array camera having a plurality of pixels that are capable of individually providing time of flight data, and electronic means for capturing the output of the array and for delivering data characterizing the location of the teats.

In yet another aspect, the invention comprises a method for automatically milking at least one teat among a plurality of teats of a live animal comprising the steps of providing movable apparatus adapted to receive instructions characterizing the location of the teat, to move to that location and to engage the teat for extracting milk therefrom, using a light source to illuminate an area encompassing the plurality of teats, using a two-dimensional array camera having a plurality of pixels that are capable of individually providing time of flight data to capture an image of the teat, processing the image to provide three dimensional information characterizing the location of the teat, using the information to provide the instructions, and moving the apparatus to engage the teat.

The foregoing was intended as a broad summary only and of only some of the aspects of the invention. It was not intended to define the limits or requirements of the invention.

Other aspects of the invention will be appreciated by reference to the detailed description of the preferred embodiment and to the claims.

BRIEF DESCRIPTION OF THE DRAWINGS

The invention will be described by reference to the detailed description of the preferred embodiment and to the drawings thereof in which.

DETAILED DESCRIPTION OF THE PREFERRED EMBODIMENT

Figure 1:
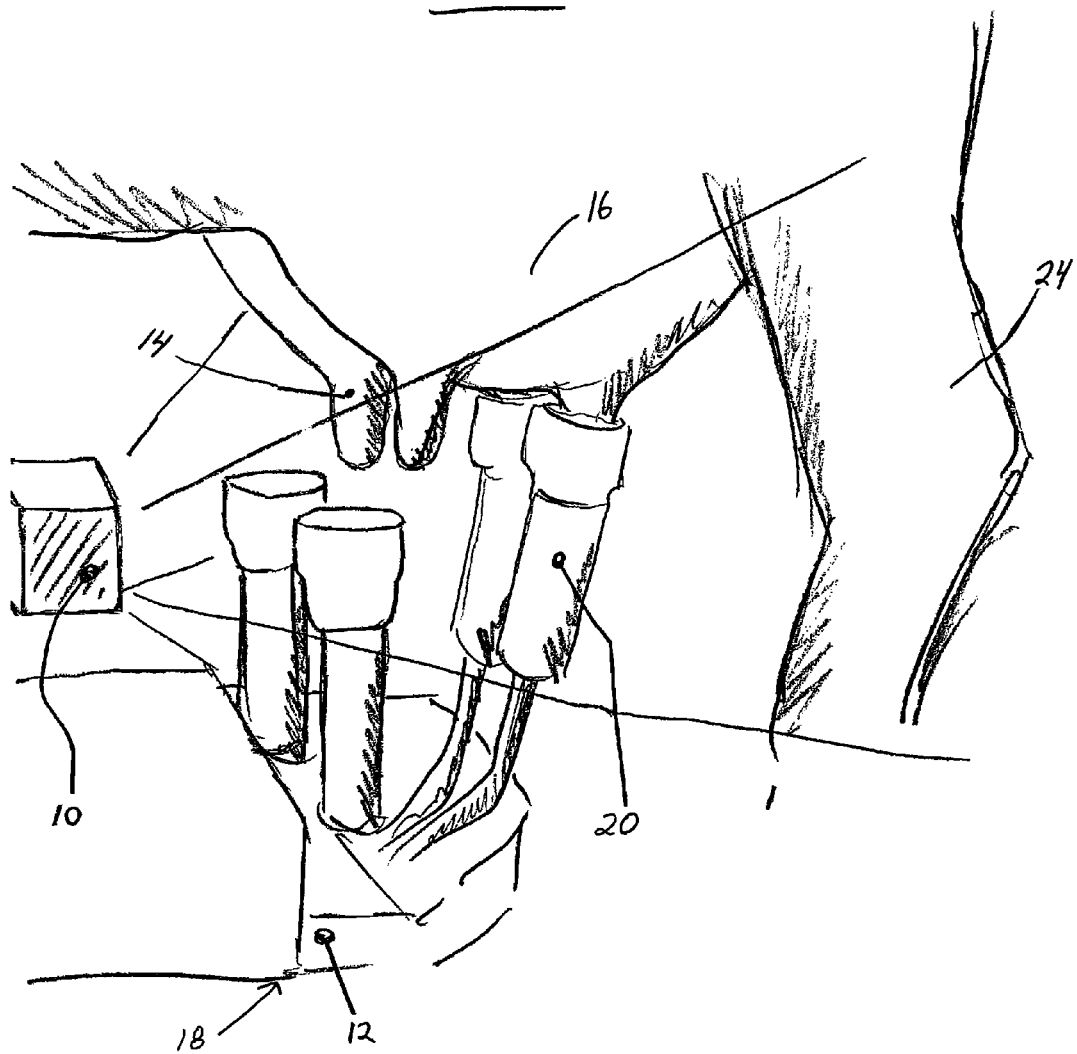
FIG. 1 is a perspective view of the system of the preferred embodiment including a time of flight sensor imaging an udder, teats and a hind leg.

FIG. 1 illustrates the preferred embodiment of the invention. A sensor housing 10 is mounted on robot arm 12 for sensing the location and attitude of teats 14 on an udder 16. The output of the sensor is used to control the application of the automated milking apparatus 18 that includes milking cups 20 that are also mounted on robot arm 12. The milking apparatus is adapted to receive instructions characterizing the location of the teats, to move the robot arm to such location so as to engage the milking cups onto the teats.

Figure 2:
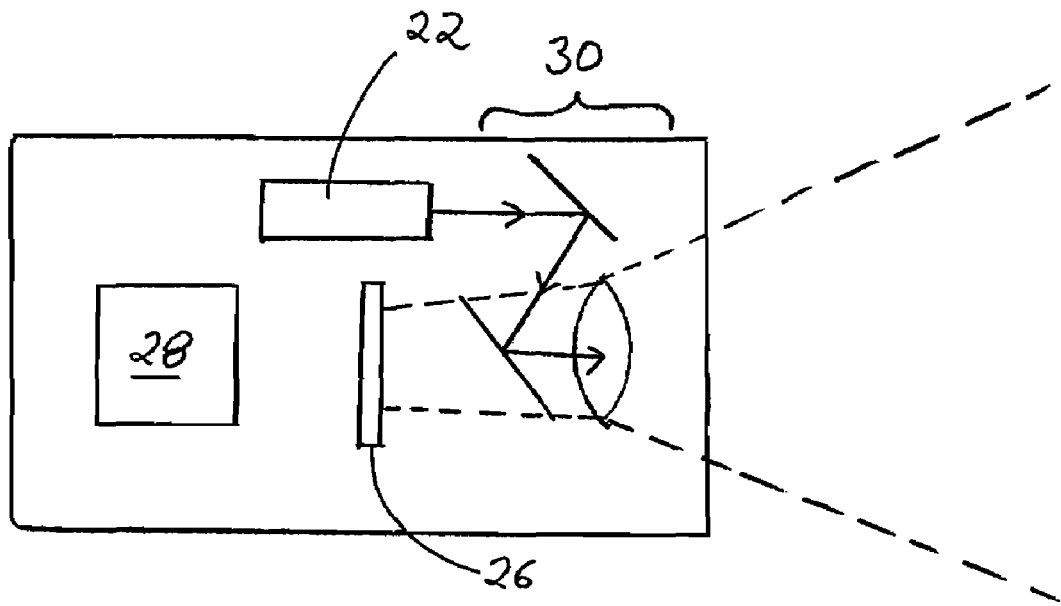
FIG. 2 is a schematic cross-sectional view of a sensor according to the preferred embodiment; and, FIG. 3 is a two dimensional array according to the preferred embodiment of the invention.

Sensor housing 10 includes a modulated light source 22 for radiating throughout the field of view that encompasses the udder 16, the teats 14 and the hind legs 24 of the animal. Referring to FIG. 2, sensor housing 10 includes a camera 26, control, image capture and readout electronics 28 and suitable optics 30.

Figure 3:
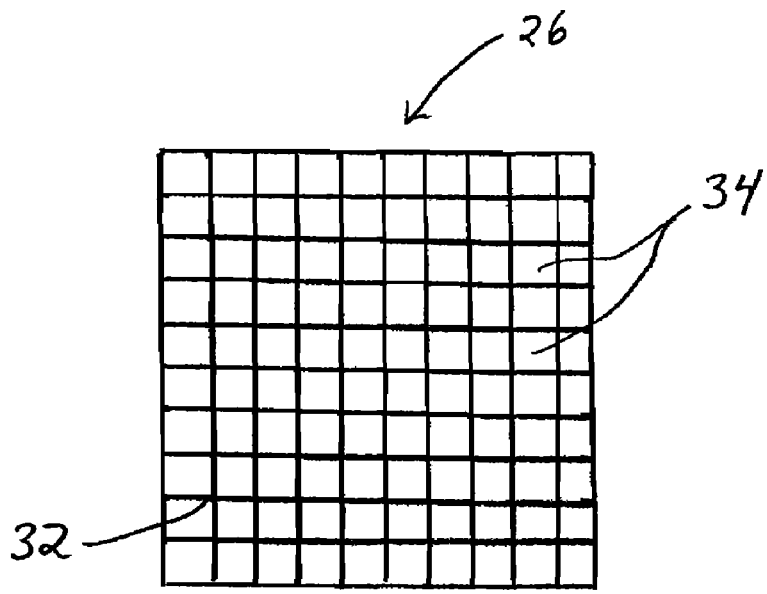

As illustrated schematically in FIG. 3, camera 26 consists of a two-dimensional array 32 of pixels 34, each of which can report time of flight data synchronized to the light source 22, as well as intensity. While relatively new, such cameras are available and are known to those skilled in the art of machine vision.

The image of a plurality of teats is captured on the two dimensional array 32 and rendered as a set of three dimensional data (using the time of flight information to determine range). The resulting data is processed to accurately represent the location of the teats in three dimensions, once angular offset is factored in. This location information is then used to instruct the milking apparatus to move robot arm 12 such that milking cups 20 engage at least one teat 14.

The invention allows the sensor to image the milking cups and the teats in one field of view, without regard to their distances from the camera and without the need to scan the field of view. This simplifies robot guidance. Moreover, provided they are unobstructed, the hind legs can be imaged in the same field of view thereby allowing the movement of the animal to be tracked, and enabling more accurate application of the suction cups to the teats.

The calibration needed for the system of the invention is also reduced in comparison to triangulation systems. As the camera can image the milking cup openings and the teats in the same image, the location of the teats becomes a relative measurement in relation to the camera, further simplifying the attachment process, as no absolute position data necessarily need be exchanged between the sensor and the robot controller.

Sensor housing 10 may be very compact as the optical set up has a much smaller footprint than in triangulation systems. The housing may be for example, 135×45×32 mm, also making it easy to manipulate robot arm 12 as necessary to obtain an unobstructed view of the teats. Within the limited space available between the belly of the animal and the tip of the milking cups, this provides an advantage over triangulation-based systems.

Time of flight sensing overcomes the depth of field problem associated with triangulation-based teat detection systems as it is no longer necessary for the teats to be scanned in order to achieve reliable location of the teats. As a result, less manipulation of the robot arm 12 is required and the location of multiple teats and of the hind legs at various distances and depths can reliably be achieved.

It will be appreciated that the preferred embodiment has been described for the purpose of illustrating the principles of the invention and variations to the preferred embodiment may be practised without departing from those principles as reflected herein and in the claims.

The invention claimed is:

1. In an automated milking system having milking apparatus for extracting milk from a plurality of teats on a live animal, use of a light source for illuminating said teats and a two-dimensional array camera having a plurality of pixels that are capable of individually providing time of flight data for capturing and delivering data for determining the location of said teats in three dimensions.

2. An automated milking system for extracting milk from a plurality of teats on a live animal, comprising:
   movable apparatus adapted to receive instructions characterizing the location of at least one of said teats, to move to said location, to engage said at least one of said teats for extracting milk therefrom;
   a light source for illuminating an area encompassing said plurality of teats;
   a two-dimensional array camera having a plurality of pixels that are capable of individually providing time of flight data;
   electronic means for capturing the output of said array and for delivering data characterizing said location.

3. A method for automatically milking at least one teat among a plurality of teats of a live animal comprising the steps of:
   providing movable apparatus adapted to receive instructions characterizing the location of said teat, to move to said location and to engage said teat for extracting milk therefrom;
   using a light source to illuminate an area encompassing said plurality of teats;
   using a two-dimensional array camera having a plurality of pixels that are capable of individually providing time of flight data to capture an image of said teat;
   processing said image to provide three dimensional information characterizing said location;
   using said information to provide said instructions; and
   moving said apparatus to engage said teat.

* * * * *

(12) EX PARTE REEXAMINATION CERTIFICATE (9252nd)
United States Patent
Metcalfe et al.

(10) Number: US 7,490,576 C1
(45) Certificate Issued: Aug. 28, 2012

(54) TIME OF FLIGHT TEAT LOCATION SYSTEM

(75) Inventors: Leonard Metcalfe, Surrey (CA); Cor Maas, Heerlen (NL)

(73) Assignee: LMI Technologies Ltd., Dublin (IE)

Reexamination Request:
No. 90/011,255, Sep. 24, 2010

Reexamination Certificate for:
Patent No.: 7,490,576
Issued: Feb. 17, 2009
Appl. No.: 11/531,672
Filed: Sep. 13, 2006

(30) Foreign Application Priority Data

Mar. 15, 2006 (CA) .............................................. 2539645

(51) Int. Cl.
*A01J 5/00* (2006.01)
*A01J 5/017* (2006.01)

(52) U.S. Cl. .................................. 119/14.08; 119/14.14
(58) Field of Classification Search ........................ None
See application file for complete search history.

(56) References Cited

To view the complete listing of prior art documents cited during the proceeding for Reexamination Control Number 90/011,255, please refer to the USPTO's public Patent Application Information Retrieval (PAIR) system under the Display References tab.

*Primary Examiner* — Jeffrey L. Gellner

(57) ABSTRACT

A teat location system for automated milking systems comprises a light projection source and a camera having a two dimensional array of pixels, each of which is capable of returning time of flight information as well as intensity. Depth of field limitations and the problem of overlapping teat images are thereby overcome or minimized.

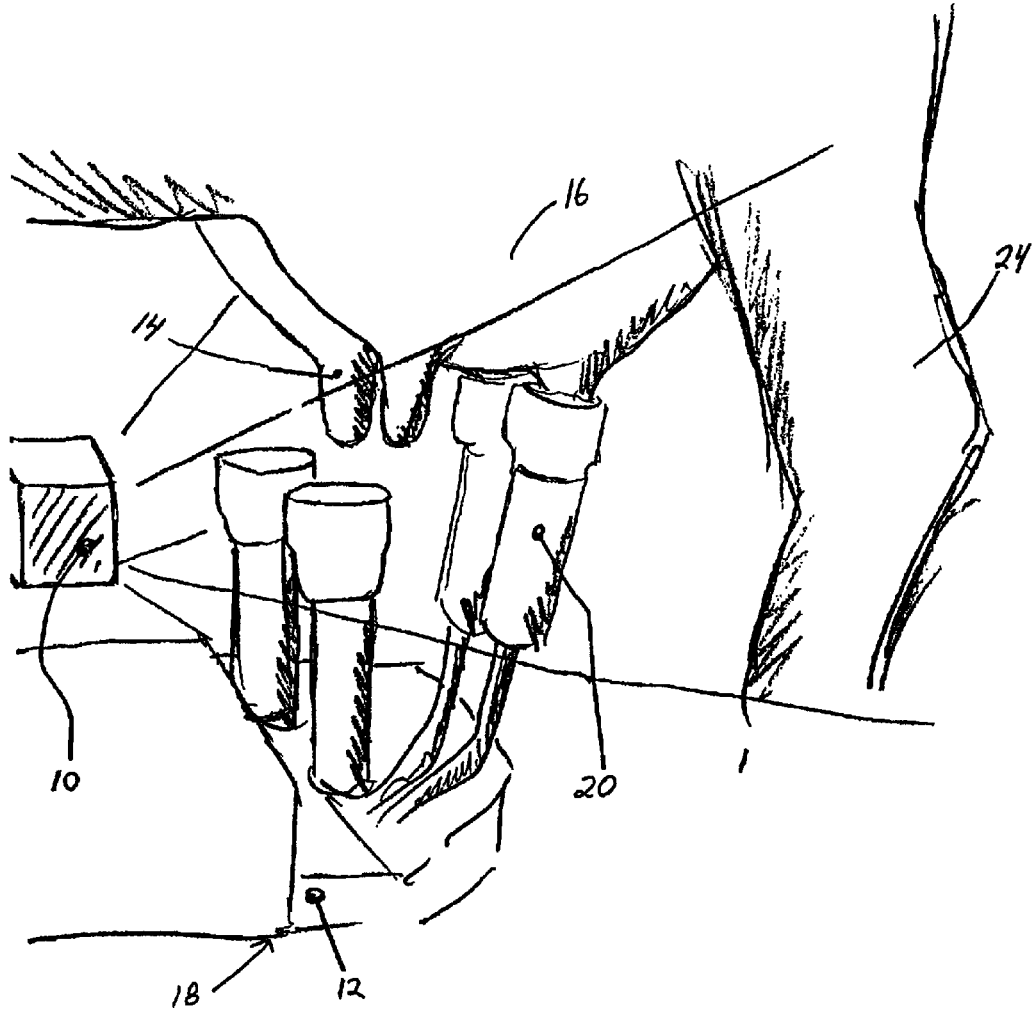

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

* * * * *